United States Patent [19]

Sato

[11] Patent Number: 5,103,248
[45] Date of Patent: Apr. 7, 1992

[54] BINOCULARS OF THE CENTER FOCUS TYPE WITH LOCK MEANS FOR LOCKING IN A STATE OF FOCUS

[75] Inventor: Akira Sato, Tokyo, Japan

[73] Assignee: Nikon Corporation, Tokyo, Japan

[21] Appl. No.: 589,029

[22] Filed: Sep. 27, 1990

[30] Foreign Application Priority Data

Oct. 2, 1989 [JP] Japan .................... 1-115945

[51] Int. Cl.$^5$ .............................. G02B 7/06
[52] U.S. Cl. ...................... 359/414; 359/823
[58] Field of Search ............ 350/552, 551, 550, 548, 350/549, 556, 563, 255

[56] References Cited

U.S. PATENT DOCUMENTS 4,229,074 10/1980 Nonogaki ........................ 350/255
4,818,086 4/1989 Moore ............................ 350/552
4,867,533 9/1989 Akin ............................. 350/552

FOREIGN PATENT DOCUMENTS 2654325 6/1978 Fed. Rep. of Germany ...... 350/552

Primary Examiner—Jon W. Henry
Attorney, Agent, or Firm—Shapiro and Shapiro

[57] ABSTRACT

Binoculars of the center focus type having a pair of bodytubes connected together through an axis shaft comprise a focus adjusting rotational member rotatably supported on the axis shaft, a moving member supported on the axis shaft in proximity to the rotational member and provided for axial movement along the axis shaft, a mechanism for arbitrarily moving the moving member only axially, and a lock mechanism responsive to the movement of the moving member to preclude the rotation of the rotational member.

4 Claims, 5 Drawing Sheets

BINOCULARS OF THE CENTER FOCUS TYPE WITH LOCK MEANS FOR LOCKING IN A STATE OF FOCUS

BACKGROUND OF THE INVENTION

1. Field of the Invention

This invention relates to binoculars having a focus adjusting device of the center focus type, and in particular to binoculars having a rotatable focus adjusting ring on an axis shaft for supporting a pair of right and left body tubes for rotation relative to each other.

2. Related Background Art

Numerous focus adjusting mechanisms have heretofore been devised in binoculars of the center focus type, and for example, the structure as shown is FIG. 7 of the accompanying drawings in known. In FIG. 7, washers 106a and 106b are sandwiched between the arm portions 101A, 101B and 102A, 102B of left and right bodytubes 101 and 102, and an axis shaft 103 is fitted in mating holes formed in the left and right arm portions 101A and 102A. The left and right bodytubes 101 and 102 are rotatable about the axis shaft 103 due to said fitting, and by fastening an axis shaft fastening screw 104, a desired smooth rotational coupling is provided through the washers 106a and 106b sandwiched between the arm portions 101A, 101B and 102A, 102B of the left and right bodytubes. A central axis pestle 107 is axially slidably fitted in the bore of the axis shaft 103, and the head of a small screw 110 studded in the central axis pestle 107 is engaged with an axially elongated slot 103A formed in the axis shaft 103 and slides in the lengthwise direction of the slot 103A to enable the rectilinear movement of the central axis pestle 107.

A focus adjusting ring 111 is fitted around the axis shaft 103, and the end portion of a small screw 109 secured to the focus adjusting ring 111 fits in a circumferential groove 103b formed in the outer periphery of the axis shaft 103 to enable only the rotational movement of the focus adjusting ring 111 and limit the axial sliding movement thereof. A central axis ring 108 is provided in the space between the axis shaft 103 and the focus adjusting ring 111, and a lead thread formed on the outer periphery thereof is threadably engaged with a helicoid thread formed on the focus adjusting ring 111 and the bore thereof slidably fits to the axis shaft 103. The small screw 110 studded in the central axis pestle 107 has its head fitted in a hole formed in the central axis ring 108.

Description will hereinafter be made of the focus adjusting operation in the prior-art binoculars constructed as described above. When the focus adjusting ring 111 is rotated, the central axis ring 108 threadably engaged with the helicoid thread formed on the bore of the focus adjusting ring 111 is moved in accordance with the lead thread thereof. With the movement of the central axis ring 108, the small screw 110 studded in the central axis pestle 107 fitted to the axis shaft 103 rectilinearly moves (axially moves) along the slot 103A formed in the axis shaft 103. Accordingly, the central axis pestle 107 is axially moved to axially move an eyepiece tube 112 through an eyepiece bridge 113 supported by the central axis pestle 107 and enable focus adjustment.

The prior-art binoculars of the center focus type are divided broadly into ones provided with a focus adjusting ring between the upper and lower arm portions as described above and ones provided with a focus adjusting ring between the eyepiece bridge 113 and the arm 102B. There have been no binoculars of either focus adjusting type in which focus lock is possible at a desired position.

In the prior-art focus adjusting device as described above, observation is effected at a desired observation distance with the focus adjusting ring rotated as appropriate. It is quite common to conduct observation of an object continuously or intermittently at the same observation distance over a long time.

For this purpose, the binoculars should be held so that the focus adjusting ring does not rotate. It is surprisingly difficult, however, to hold the binoculars in their in-focus state when observation is discontinued or when the binoculars are handed over to another observer. Also, because the focus adjusting ring is designed to be readily rotated, there has been the problem that even if substantial care is taken, the ring is rotated with a slight force and so deviates from the initial in-focus position. Thus, it becomes necessary to perform the focusing operation again to match the in-focus distance with the object of observation.

SUMMARY OF THE INVENTION

It is an object of the present invention to provide binoculars of the center focus type in which a focusing device can be easily locked in a state in which it is focused to a desired observation distance.

To achieve the above object, the binoculars according to the present invention are binoculars of the center focus type having a pair of right and left bodytubes connected together through an axis shaft, characterized by a focus adjusting rotational member rotatably supported on the axis shaft, a moving member supported on the axis shaft in proximity to the focus adjusting rotational member and axially movable along the axis shaft, moving means for arbitrarily moving said moving member only axially, and focus adjustment lock means for precluding or permitting the rotation of the focus adjusting rotational member in accordance with the movement of the moving member.

In the binoculars of the present invention constructed as described above, the focus adjusting rotational member can be locked at any position by the focus adjustment lock means and therefore, when it is desired to observe an object same focus position over a long period, there is not the inconvenience as experienced in the prior art that the positional deviation of the focus occurs so that focus adjustment must be re-effected. Thus, it becomes possible, for example, for a plurality of observers to readily observe the same object of observation alternately with the same binoculars. Also, since the focus position can be locked at a desired position, a pair of binoculars can serve as both binoculars of the fixed focus type and binoculars of the adjustable focus type.

Other objects, features and effects of the present invention will become fully apparent from the following detailed description taken in conjunction with the accompanying drawings.

DESCRIPTION OF THE PREFERRED EMBODIMENTS

An embodiment of the present invention will hereinafter be described in detail with reference to the accompanying drawings.

Figure 1:
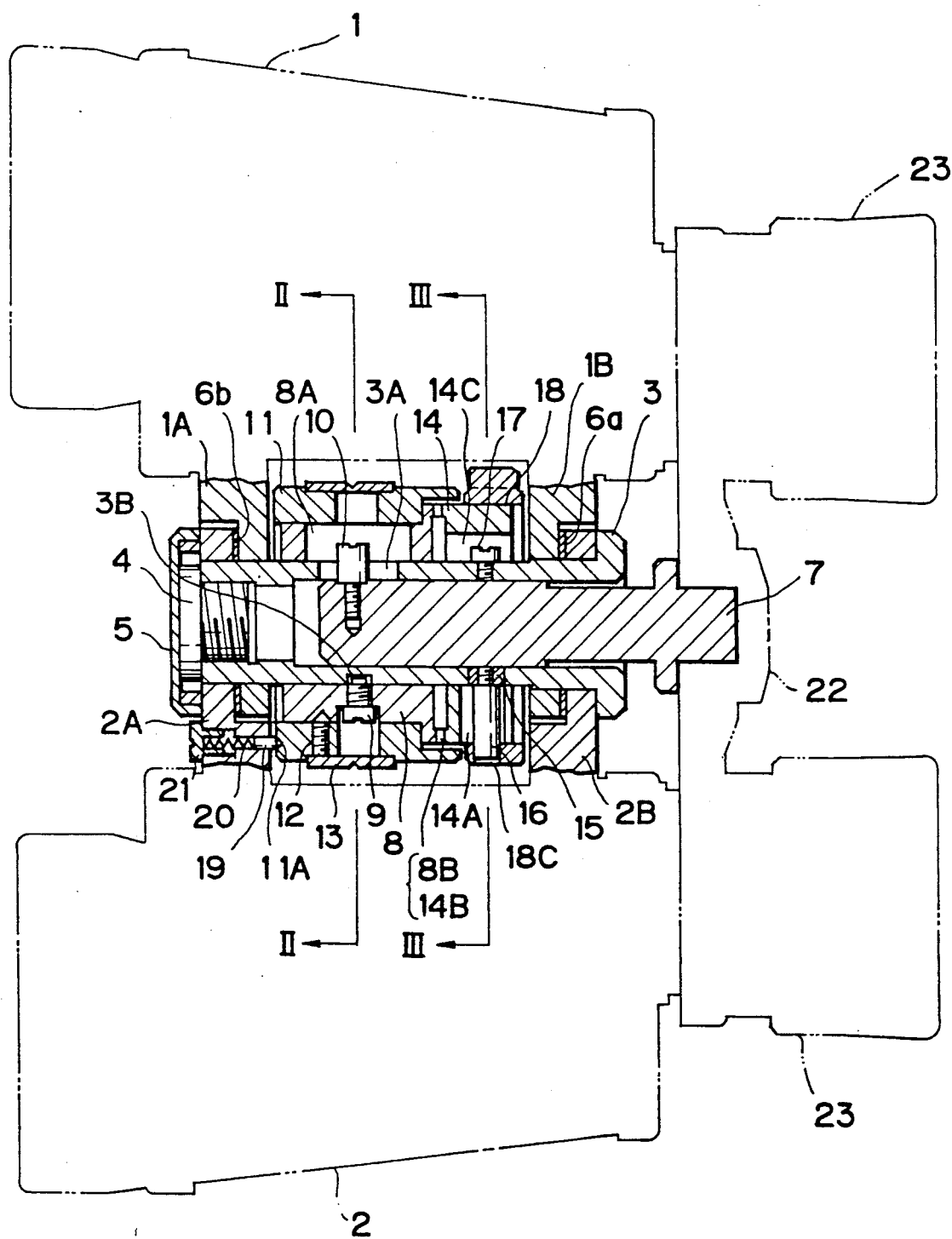
FIG. 1 is a partly cross-sectional view showing the construction of the axis shaft portion of an embodiment of the present invention.
Figure 3:
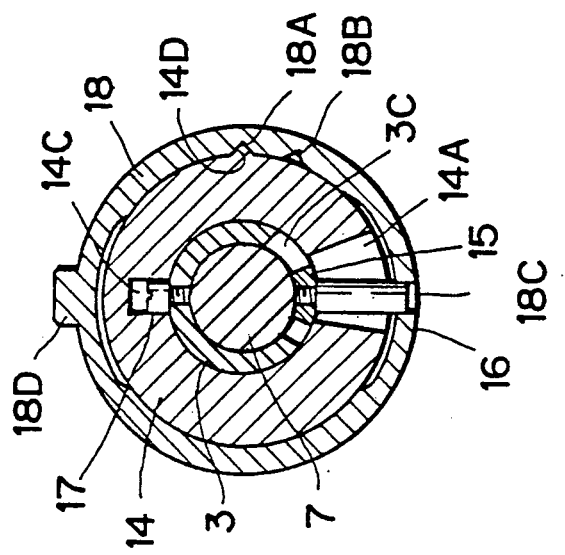
FIG. 3 is a cross-sectional view taken along line III—III in FIG. 1.
Figure 2:
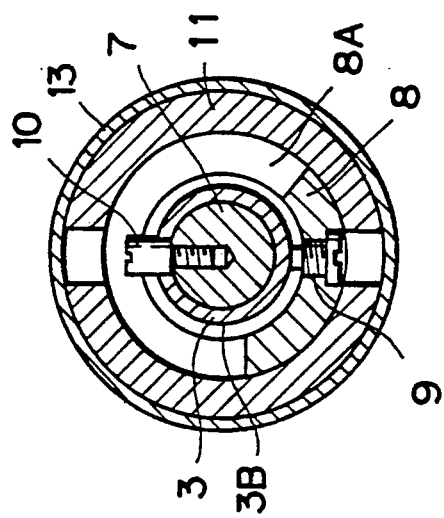
FIG. 2 is a cross-sectional view taken along line II—II in FIG. 1.

Referring to FIGS. 1, 2 and 3, washers 6a and 6b are sandwiched between the arm portions 1A and 2A of left and right bodytubes 1 and 2, respectively, and an axis shaft 3 is fitted in mating holes formed in left and right arm portions 1A, 1B and 2A, 2B. This axis shaft 3 is unrotatably secured to the arm portion 2B of the right bodytube 2, and the left bodytube 1 is rotatable about the axis shaft 3 due to said fitting. By an axis shaft fastening screw 4 being fastened as shown, a desired smooth rotational coupling is provided through the sandwiched washers 6a and 6b. The head of the axis shaft fastening screw 4 is covered with a decorative cap 5. A central axis pestle 7 is slidably fitted to the inner periphery of the axis shaft 3, and a pin 10 studded in the central axis pestle 7 is engaged with an axially elongated slot 3A formed in the axis shaft 3. The pin 10 is guided by the slot 3A and is slidable in the lengthwise direction of the axis shaft to thereby enable the rectilinear movement of the central axis pestle 7.

Figure 6:
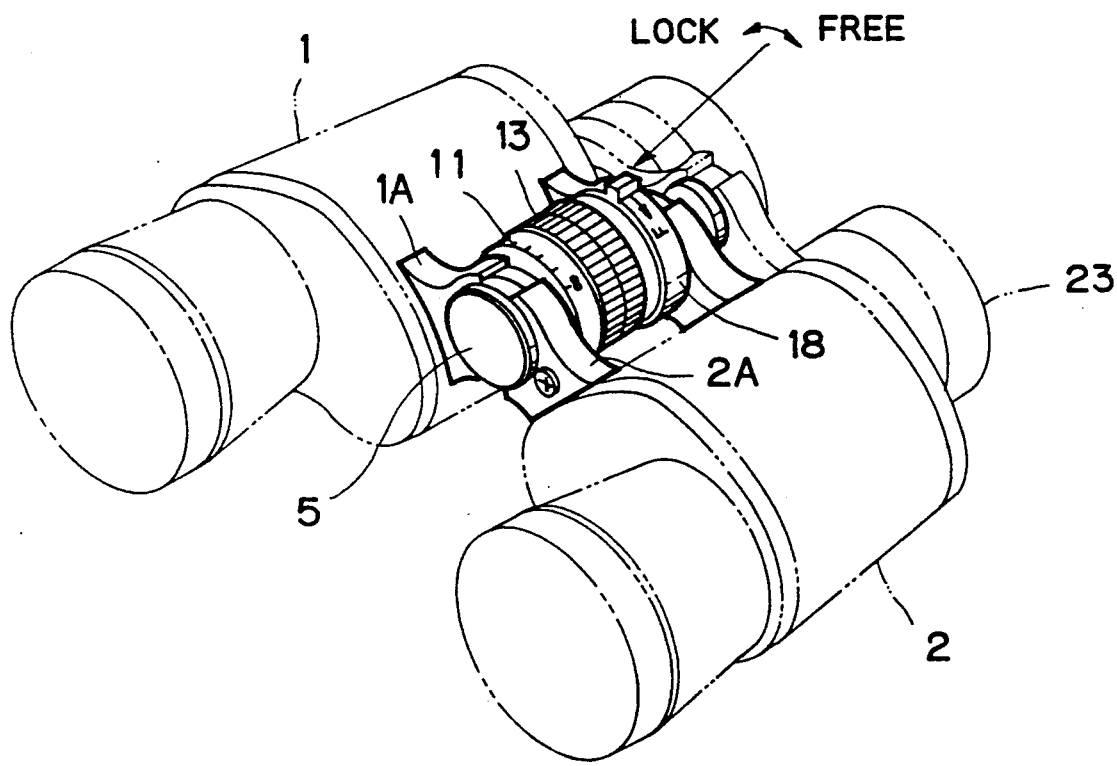
FIG. 6 is a perspective view showing the external appearance of the binoculars shown in FIG. 1.
Figure 7:
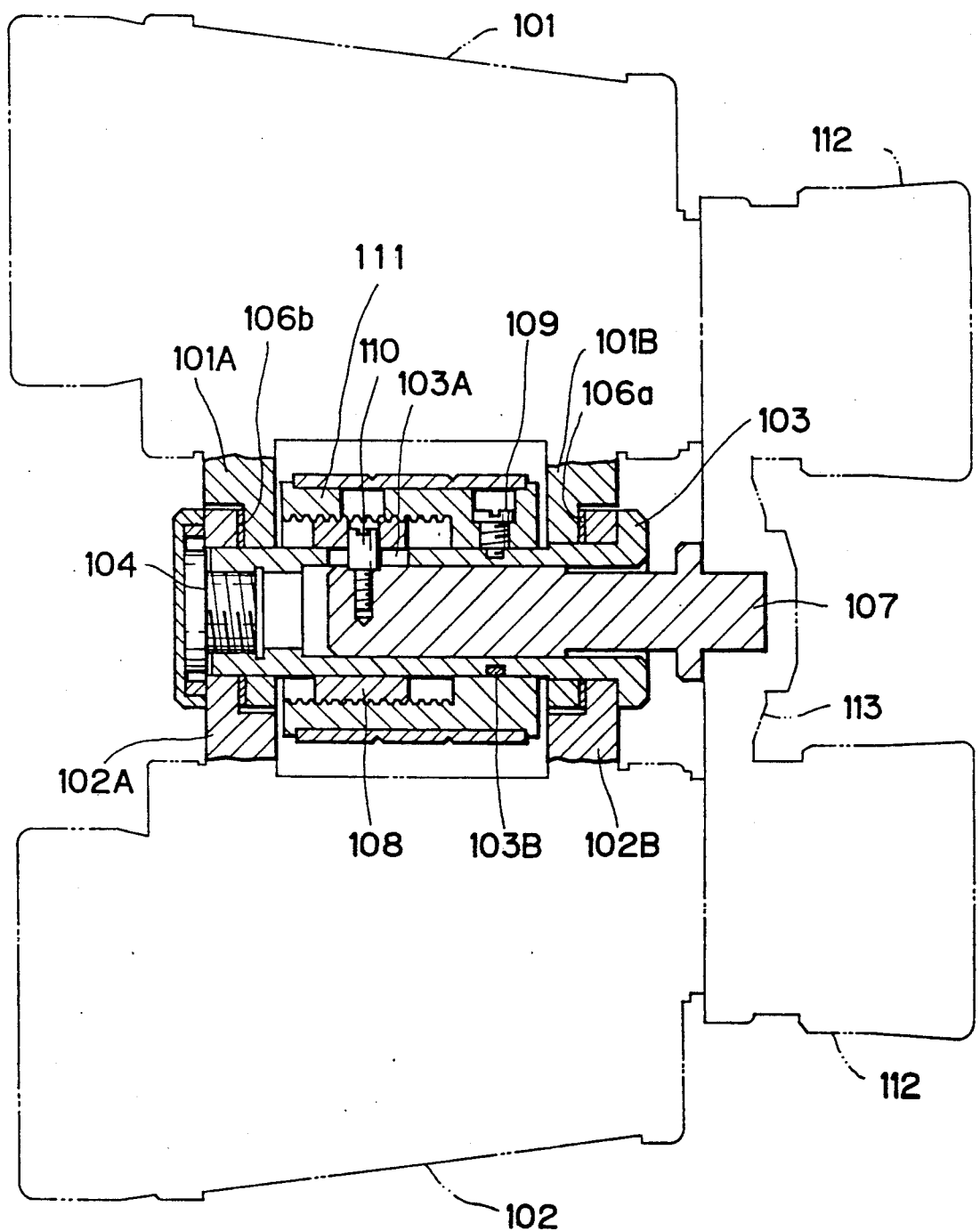
FIG. 7 is a partly cross-sectional view showing the construction of the axis shaft portion of binoculars of the center focus type according to the prior art.

A central axis ring 8 is rotatably fitted to the outer periphery of the axis shaft 3, and the head of the pin 10 extending through the slot 3A fits in a cam slot 8A formed obliquely in the central axis ring 8. A pin 9 is screwed into the central axis ring 8, and the tip end of the pin 9 fits in an annular groove formed in the outer periphery of the axis shaft 3. Thereby the central axis ring 8 is constrained against axial movement and is only rotatable. Also, one end surface of the central axis ring 8 is provided with a serration 8B radially formed about the axis. A focus adjusting ring 11 is fixed to the central axis ring 8 by a set screw 12 after position adjustment. The outer periphery of the focus adjusting ring 11 is formed with ∞ mark and distance divisions as shown in FIG. 6, and is also formed with a conical hole 11A for click stop in accordance with the ∞ mark and distance position. A drop-in pin 19 provided on the arm portion 2A, a compression spring 20 and a screw 21 for compressing the spring 20 are members for click stop operation. The outer periphery of the focus adjusting ring 11 is covered with a rubber knurled ring 13 so as to facilitate the rotation of the focus adjusting ring 11.

As shown in FIG. 3, a slide ring 14 is fitted to the outer periphery of the axis shaft 3, and the head of a small screw 17 threaded into the axis shaft 3 fits to a key way 14C formed in the slide ring 14, whereby the slide ring 14 is constrained against rotation and rectilinearly movable only in the axial direction. The slide ring 14 has an oblique cam slot 14A, a radial serration 14B formed at a side position opposed to the serration 8B, and a projection 14D provided on the outer periphery thereof as shown in FIG. 3. A focus adjustment lock ring 18 provided between the slide ring 14 and the arm portion 1B of the bodytube 1 is rotatably fitted to the outer periphery of the slide ring 14. An engagement pin 16 extends through a mating hole 18C formed in the focus adjustment lock ring 18 and fits in the oblique cam slot 14A. This engagement pin 16 has its tip end screwed into a piece 15 rotatably inserted in a circumferentially elongated cross groove 3C formed in the axis shaft 3. The projection 14D and V-grooves 18A and 18B constitute a click stop mechanism provided for the circumferential positioning in the lock and free operations of the focus adjustment lock ring 18 having a projected portion 18D on the outer periphery thereof.

The operation of the focus lock device according to the present invention constructed as described above will now be described.

When the focus adjusting ring 11 is rotated to effect focus adjustment, the central axis ring 8 made integral therewith by the set screw 12 rotates about the axis shaft 3. The pin 9 is secured to the central axis ring 8 and the tip end portion thereof is engaged with the annular groove 3B formed in the axis shaft 3 to thereby prevent axial movement of the central axis ring 8. Because the head of the pin 10 studded in the central axis pestle 7 is engaged with the oblique cam slot 8A formed in the central axis ring 8 and the slot 3A formed in the axis shaft 3, when the central axis ring rotates, the pin 10 is guided by the slot 3A and moves in the axial direction. Consequently, the central axis pestle 7 moves in the axial direction with the pin 10 to move an eyepiece portion 23 coupled to the central axis pestle 7 through an eyepiece bridge 22, whereby focus adjustment is effected.

When a desired focus position has been determined by the above-described operation, the focus adjustment lock ring 18 is rotated, whereby the mating between the V-grooves 18A, 18B formed in the inner periphery of the focus adjustment lock ring 18 and the projection 14D of the slide ring 14 is moved from the free side (18B) of the V-grooves to the lock side (18A). The engagement pin 16 operatively associated with the rotation of the focus adjustment lock ring 18 is constrained against axial movement by the piece 15 and is only rotatable. The slide ring 14 is moved through the oblique cam slot 14A by the rotation of the engagement pin 16 and at that time, the slide ring 14 is constrained in the direction of rotation by the engagement between the key way 14C and the small screw 17 and therefore rectilinearly moves in the axial direction. The amount of the rectilinear movement is adjusted so that when the projection 14D drops into the lock side V-groove 18A, the serration 8B of the central axis ring 8 and the opposing serration 14B of the slide ring 14 mesh with each other.

The central axis ring 8 has its focus adjustment lock effected by the serrations 8B and 14B meshing with each other to prevent the rotation of the central axis ring 8.

When it is desired to change a desired focus position, the projection 18D of the focus adjustment lock ring 18 is rotated about the axis shaft 3 from the lock side (18A) to the free side (18B), whereby an operation converse to the above-described locking operation is performed and the meshing engagement between the serrations 8B and 14B is released. Thus, the focus adjusting ring 11 rotates freely and focus adjustment maybe accomplished.

Figure 4:
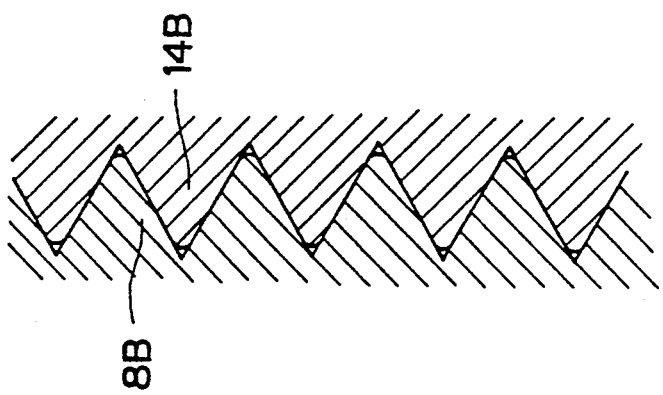
FIG. 4 is an enlarged view showing the meshing state of serrations for focus adjustment locking in FIG. 1.

FIG. 4 is an enlarged view illustrating the locked state and showing the meshing engagement between the serration 8B formed on the central axis ring 8 and the serration 14B formed on the slide ring 14.

Figure 5:
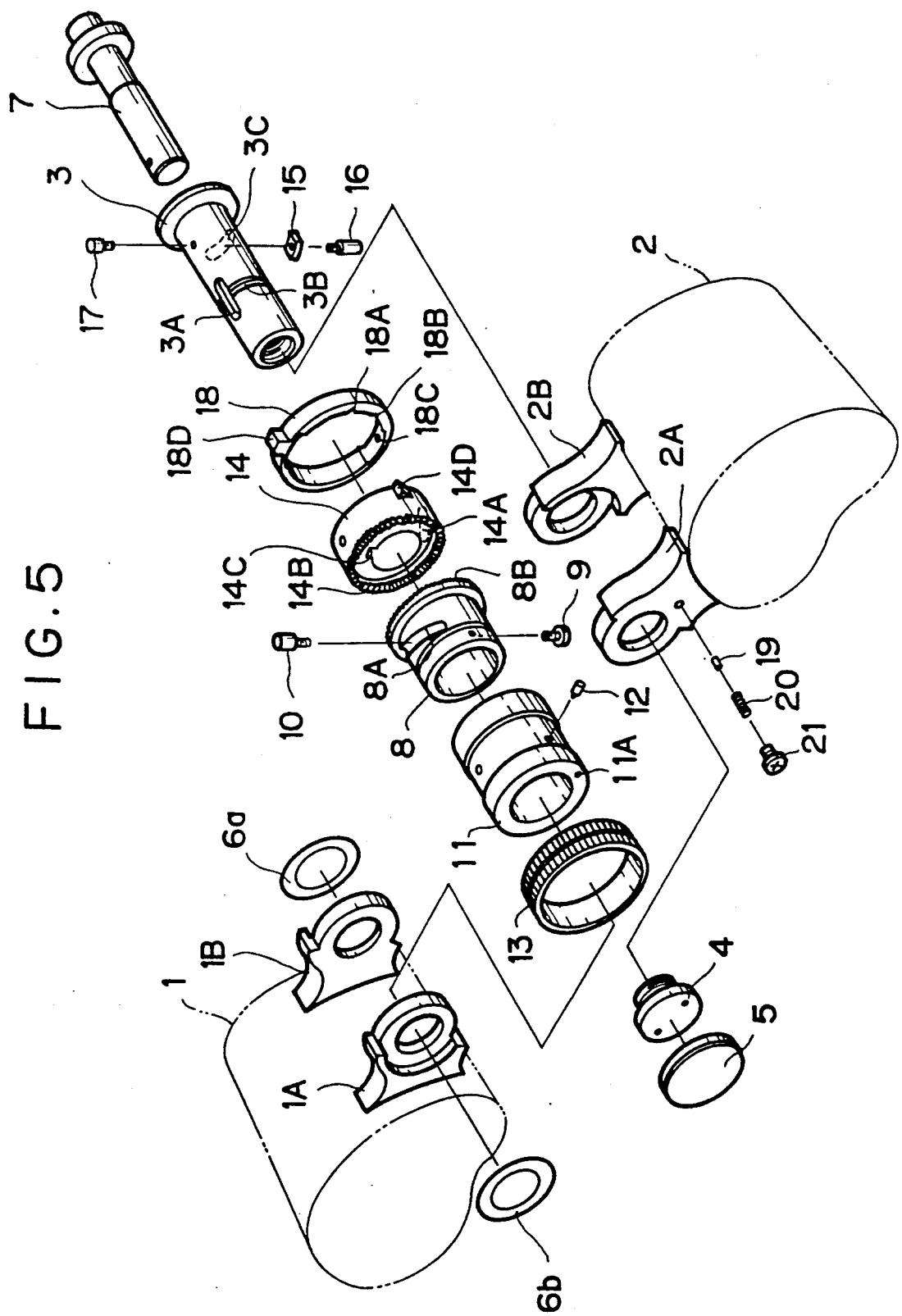
FIG. 5 is an exploded perspective view showing the construction of the binoculars of FIG. 1, except the eyepiece portions thereof.

FIG. 5 is an exploded perspective view of the embodiment of the present invention shown in FIG. 1, and shows the relative arrangement of between the constituent members. The reference numerals used for the members are identical to those in FIGS. 1-4 and therefore need not be described here.

FIG. 6 is a pictorial perspective view of the embodiment shown in FIG. 1. The left and right bodytubes 1 and 2 are supported by the axis shaft and made rotatable by the axis shaft fastening screw and the washers. The rubber knurled ring 13 on the focus adjusting ring 11 is rotated to thereby effect focus adjustment, and the focus position is locked by the locking operation of the focus adjustment lock ring 18.

In the above-described embodiment, the stoppage of the rotation of the central axis ring 8 is accomplished by the meshing engagement between the serrations. However, it is readily apparent that this is not the only available means, for this purpose. For example, a magnet or the like may also be used, or members of high frictional resistance may be used for the abutment surfaces of the central axis ring 8 and slide ring 14, whereby the rotation of the focus adjusting ring 11 may be locked. Also, the above-described embodiment is binoculars of the center focus type in which eyepieces are axially moved, but of course, the present invention is also applicable to binoculars of the center focus type in which objective lenses are axially moved.

What is claimed is:

1. Binoculars of the center focus type having a pair of bodytubes connected together through an axis shaft, comprising:
   a focus adjusting rotational member rotatably supported on said axis shaft;
   a moving member supported on said axis shaft in proximity to said rotational member and provided for axial movement along said axis shaft;
   moving means for arbitrarily moving said moving member only axially; and
   lock means responsive to the movement of said moving member to preclude the rotation of said rotational member.

2. Binoculars according to claim 1, wherein said lock means includes a pair of serrations formed on mutually opposed sides of said rotational member and said moving member and capable of meshing with each other.

3. Binoculars according to claim 1, wherein said moving means includes an operating ring rotatively operated about said axis shaft, a cam slot formed in said moving member to convert the rotation of said operating ring into the axial movement of said moving member, and an engagement pin slidably engaged with said cam slot and rotatable with said operating ring.

4. Binoculars according to claim 3, wherein said moving means further includes a click stop mechanism for determining rotated positions of said operating ring whereat said moving member is disposed, respectively, in a lock position in which said lock means precludes the rotation of said rotational member and a free position in which said lock means permits the rotation of said rotational member.

* * * * *